United States Patent [19]

Bressler et al.

[11] 3,769,172

[45] Oct. 30, 1973

[54] STABILIZED PHENOL NITROPRUSSIDE REAGENT AND ANALYSIS OF NITROGEN

[75] Inventors: Leo F. Bressler, St. Louis; Charles F. Steinbrink, Jr., Fenton, both of Mo.

[73] Assignee: Sigma International Ltd., Saint Louis, Mo.

[22] Filed: May 1, 1972

[21] Appl. No.: 248,873

[52] U.S. Cl. ............ 195/103.5 R, 195/99, 23/230 B
[51] Int. Cl. ............................................ G01n 31/14
[58] Field of Search ............................ 195/103.5 R; 23/230 B

[56] References Cited
UNITED STATES PATENTS
3,119,751   1/1964   Chaney ..................... 195/103.5 R
3,432,395   3/1969   Reardon ..................... 195/103.5 R FOREIGN PATENTS OR APPLICATIONS
872,933   6/1971   Canada ..................... 195/103.5 R

OTHER PUBLICATIONS

Henry "Clin. Chem: Principles and Technics" p. 266–269 (1964).

*Primary Examiner*—Alvin E. Tanenholtz
*Assistant Examiner*—Max D. Hensley
*Attorney*—Philip B. Polster et al.

[57] ABSTRACT

An aqueous solution of phenol and nitroprusside is stabilized with a chelating agent such as EDTA or NTA. The reagent is particularly useful for the determination of urea nitrogen by a modified urease-Berthelot reaction.

7 Claims, No Drawings

STABILIZED PHENOL NITROPRUSSIDE REAGENT AND ANALYSIS OF NITROGEN

BACKGROUND OF THE INVENTION

This invention relates to a stabilized phenol nitroprusside reagent useful, for example, in the determination of urea nitrogen by urease hydrolysis of urea to ammonia and colorimetric determination of ammonia by a Berthelot method utilizing the phenol-nitroprusside reagent and an alkaline hypochlorite reagent. The method of Fawcett and Scott, J. Clin. Path., 13, 156 (1960) and a modification of the method described by Chaney in U.S. Pat. No. 3,119,751 have provided a useful approach to the determination of urea nitrogen in biological fluids and ammonia nitrogen in other solutions. However, these approaches have required that fresh reagents be made up relatively frequently, because the required aqueous solutions of phenol (or phenate) and nitroprusside are well known to be unstable.

The present invention further simplifies the determination of urea nitrogen by providing a stable aqueous solution of phenol and nitroprusside.

SUMMARY OF THE INVENTION

In accordance with this invention, generally stated, a stable aqueous phenol nitroprusside solution is provided by adding to the solution a chelating agent. For example, the chelating agent may be EDTA (ethylene diamine tetraacetic acid), NTA (nitrilotriacetic acid), EGTA (Ethylene glycol-bis-$\beta$-amino ethyl ether N,N' tetraacetic acid), and ethylene diamine di(o-hydroxy-phenyl acetic acid). The addition of a chelating agent does not affect the usefulness of the reagent in ammonia nitrogen determinations and preserves the essential water white appearance of the reagent upon long term storage. The reagent may be used in a procedure in which urea nitrogen is determined in a biological fluid by mixing the sample and a lyophilized urease buffer to hydrolize urea to ammonia, the stabilized phenol nitroprusside reagent and an alkaline hypochlorite reagent are added to develop a blue green color, and the depth of color is determined at a wave length of from 500 to 650 m$\mu$.

DESCRIPTION OF THE PREFERRED EMBODIMENT

The following examples are illustrative of stable reagents of the present invention:

EXAMPLE 1

56 grams of phenol
0.25 grams of sodium nitroprusside
0.020 grams EDTA
1000 ml water The foregoing reagents are thoroughly mixed and stored in an amber bottle at 0° to 5° C. The reagent retains its water white appearance for at least six months.

EXAMPLE 2

56 grams phenol
0.25 grams nitroprusside
0.020 grams NTA (nitrilotriacetic acid)
1000 ml water

EXAMPLE 3

56 grams phenol
0.25 grams nitroprusside
0.020 grams EGTA (ethylene glycol-bis-$\beta$-amino ethyl ether N,N' tetraacetic acid)
1000 ml water

EXAMPLE 4

56 grams phenol
0.25 grams nitroprusside
0.020 grams ethylene diamine di(o-hydroxy-phenyl acetic acid)
1000 ml water In all of the foregoing Examples 2-4 the degradation of the reagent by the formation of a blue color is inhibited markedly as compared with a reagent without the chelating agent, stored under like conditions.

As an example of the use of the stabilized reagent of the invention, the following procedure is given:

Three cuvettes (ex. 19X 105 mm) are labeled "blank," "standard" and "test" and to each cuvette is added 0.5 ml urease solution (3 units per ml). To the "blank" tube is added 10 $\mu$l water, to the "standard" tube is added 10 $\mu$l urea nitrogen standard solution (30 mg per 100 ml water), and to the "test" tube is added 10 $\mu$l of plasma. The tubes are incubated for 5 to 10 minutes at 37° or for 15 to 20 minutes at room temperature to hydrolize urea to ammonia. To each tube is added one ml phenol nitroprusside solution (from EXAMPLE 1), 1 ml alkaline hypochlorite reagent (2.1 gm sodium hypochlorite, 25 gm NaOH in 1000 ml water), and 5 ml water. The reagents are mixed and incubated at 37° C for at least 5 minutes or at room temperature for at least 20 minutes. Optical density is read at 570 m$\mu$ (plus or minus 10 m$\mu$). Urea nitrogen concentration (mg%) of the test solution is equal to 30 times the ratio of optical density of the test solution to the optical density of the standard solution.

The same procedure may be used to determine urinary urea nitrogen levels by substituting 10 micro liters of a 100 fold dilution of urine for the serum of the foregoing procedure.

It will be seen that the nitrogen concentration may be determined from a prepared calibration curve; however, such a curve should be redone for each new lot of phenol nitroprusside reagent and alkaline hypochlorite reagent.

Having thus described the invention, what is claimed and desired to be secured by Letters Patent is:

1. A reagent consisting of an aqueous solution of phenol, an alkaline metal salt of nitroprussic acid, and sufficient amount of a chelating agent to inhibit coloration of the solution.

2. The reagent of claim 1 wherein the phenol concentration is approximately 5–7 percent (W/V), the nitroprusside is between about 0.2 and 4.0 millimolar and the chelating agent is between $10^{-5}$ and $10^{-1}$ molar.

3. The reagent of claim 1 wherein the chelating agent is EDTA.

4. The reagent of claim 1 wherein the chelating agent is NTA.

5. A reagent package for the determination of urea nitrogen comprising a first vial of buffered urease; a second vial containing a reagent consiting of an aqueous solution of phenol, an alkaline metal salt of nitroprussic acid and a sufficient amount of a chelating agent to inhibit colaration of the solution of phenol and alkaline metal salt of nitroprussic acid; and a third vial of an aqueous solution of alkaline metal hypochlorite.

6. A method for the determination of ammonia nitrogen in a test solution comprising adding to the test solution an alkaline hypochlorite reagent and a stabilized phenol nitroprusside reagent, said stabilized phenol nitroprusside reagent consisting essentially of an aqueous solution of phenol, an alkaline metal salt of nitroprussic acid, and sufficient amount of a chelating agent to inhibit coloration of the phenol nitroprusside reagent, and thereafter determining the depth of color formed, hence the nitrogen concentration in the test solution.

7. A method for determining the concentration of urea nitrogen in a biological fluid comprising a first step of urease hydrolysis of the urea nitrogen to convert the urea nitrogen in said biological fluid to ammonia nitrogen in solution, thereafter a second step of adding to said solution an alkaline hypochlorite reagent and a stabilized phenol nitroprusside reagent, said phenol nitroprusside reagent consisting essentially of an aqueous solution of phenol, an alkaline metal salt of nitroprussic acid and a sufficient amount of a chelating agent to inhibit coloration of the solution of phenol and alkaline metal salt of nitroprussic acid, and thereafter a third step of determining the depth of color formed, hence the concentration of urea nitrogen in the biological fluid.

* * * * *